US007735898B1

(12) United States Patent
Bridges

(10) Patent No.: US 7,735,898 B1
(45) Date of Patent: Jun. 15, 2010

(54) FOLDING TRUCK BED COVER SYSTEM

(76) Inventor: Levi Bridges, 401 Eagle Ter., Ofallon, IL (US) 62269

( * ) Notice: Subject to any disclaimer, the term of this patent is extended or adjusted under 35 U.S.C. 154(b) by 0 days.

(21) Appl. No.: 12/271,254

(22) Filed: Nov. 14, 2008

(51) Int. Cl.
*B60P 7/02* (2006.01)
(52) U.S. Cl. .............................. 296/100.06; 296/100.01
(58) Field of Classification Search ............ 296/100.01, 296/100.02, 100.04, 100.06, 100.07, 100.08
See application file for complete search history.

(56) References Cited

U.S. PATENT DOCUMENTS

| 3,069,199 | A | 12/1962 | Reardon et al. |
| 3,995,890 | A | 12/1976 | Fletcher |
| 4,261,611 | A | 4/1981 | Barry et al. |
| 4,284,303 | A | 8/1981 | Hather |
| D287,710 | S | 1/1987 | Pino |
| 5,013,078 | A | 5/1991 | Eckerd et al. |
| 6,254,169 | B1 | 7/2001 | Arthur |
| 6,598,930 | B1 | 7/2003 | Tilton |
| 6,663,160 | B2 * | 12/2003 | Yarbrough et al. ..... 296/100.06 |
| 6,799,784 | B2 | 10/2004 | Rios |
| 7,118,159 | B1 | 10/2006 | Andrews |

* cited by examiner

*Primary Examiner*—Lori L Lyjak
(74) *Attorney, Agent, or Firm*—Kyle Fletcher

(57) ABSTRACT

The present invention is a folding truck bed cover system that includes a pair of truck bed covers, a pair of bed rails, a pair of supporting braces, and a folding roof cloth. The truck bed covers can rotate flat to cover the truck bed or to a vertical position via a gas strut that is mounted along the front wall of the truck bed. The folding roof cloth can be draped over the truck bed covers when in a vertical position, and therein said folding roof cloth is secured via the bed rails.

5 Claims, 6 Drawing Sheets

FOLDING TRUCK BED COVER SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of truck bed cover systems, more specifically, a truck bed cover system that can either fold up to create more covered room for the truck bed or can fold down to cover the top of the truck bed.

B. Discussion of the Prior Art

As a preliminary note, it should be stated that there is an ample amount of prior art that deals with truck bed cover systems. As will be discussed immediately below, no prior art discloses a truck bed cover system that can fold up to increate the volume of covered space or flat to cover the truck bed.

The Rios Patent (U.S. Pat. No. 6,799,784) discloses a folding utility truck rack with side panels and locking bed cover. However, the truck rack does not include a folding roof cloth that can cover the truck rack when folded up.

The Hather Patent (U.S. Pat. No. 4,284,303) discloses a pickup truck cover and hinge construction. However, the truck cover rotates about a pivoting bar, and does not include a folding roof cloth to cover the truck cover when folded up.

The Reardon et al. Patent (U.S. Pat. No. 3,069,199) discloses a truck bed cover assembly that folds in half and opens up exposing the entire bed of the truck. However, the cover assembly does not include a bed rail as the means of securing a folding roof cloth over the assembly when said assembly is folded up exposing the truck bed.

The Fletcher Patent (U.S. Pat. No. 3,995,890) discloses a structure having a movable roof formed in two sections wherein said sections are pivotally secured to the side walls by hinge elements and to the front and rear walls by control arms, and wherein the roof panels are pivotal from a closed, horizontal position to an open vertical position disposed alongside the side walls. However, the roof is of a solid construction, as opposed to a folding roof cloth that is secured to bed rails.

The Arthur Patent (U.S. Pat. No. 6,254,169) discloses a removable cover system for use on a pickup truck bed, the bed having a floor, side walls, a front wall, and a tailgate. However, the gas struts are mounted along the side of the pickup truck bed as opposed to the front wall of the pickup truck bed. Furthermore, the cover system does not include a bed rail for securing a folding roof cloth over the top of the cover assembly.

The Tilton Patent (U.S. Pat. No. 6,598,930) discloses a dual purpose truck bed cover that includes a pair of door panels that are hinged respectively to the side walls of a truck bed. However, the truck bed cover requires a lateral member that mounts along the front wall of the truck bed in order to provide struts to move with the covers. Furthermore, the truck bed cover does not include a set of bed rails to secure a folding roof cloth to the top of the truck bed cover when raised in an up position.

The Eckerd et al. Patent (U.S. Pat. No. 5,013,078) discloses a container for enclosing the box of a pick-up truck that includes a pair of sidewalls, a front wall, a rear wall and a roof having two panels connected by hinges to the outer side edges of the sidewalls to permit each of the panels to be approximately 270 degrees from a closed position to an open position. However, the roof is of solid construction as opposed to a folding roof cloth that is secured about bed rails that are mounted to the top of the truck bed adjacent the door lids.

The Barry et al. Patent (U.S. Pat. No. 4,261,611) discloses a cover for the bed of a truck that moves on a U-rail and can be lifted using a hydraulic lift piston, and that can be moved to one side of the bed or the other. However, the cover does not fold up, and have bed rails for securing a folding roof cloth upon the bed cover when in the up position.

The Andrews Patent (U.S. Pat. No. 7,118,159) discloses a convertible tonneau cover is positionable between a covering configuration wherein the tonneau covers a pickup truck bed and a rack position wherein the tonneau forms a material handling rack. However, the tonneau does not fold into a vertical, locked position and include a folding roof cloth to cover said cover with the aid of a bed rail on each side of the truck bed.

While the above-described devices fulfill their respective and particular objects and requirements, they do not describe a folding truck bed cover system that provides for the advantages of the folding truck bed cover system. In this regard, the folding truck bed cover system departs from the conventional concepts and designs of the prior art.

BRIEF SUMMARY OF THE INVENTION

The present invention is a folding truck bed cover system that includes a pair of truck bed covers, a pair of bed rails, a pair of supporting braces, and a folding roof cloth. The truck bed covers can rotate flat to cover the truck bed or to a vertical position via a gas strut that is mounted along the front wall of the truck bed. The folding roof cloth can be draped over the truck bed covers when in a vertical position, and therein said folding roof cloth is secured via the bed rails.

An object of the invention is to provide a truck bed cover that can either cover the truck bed directly or fold up to provide more volume to be supported by the truck bed.

A further object of the invention is to provide a pair of supporting braces and a folding roof cloth that can provide a covering for the increased volume of the truck bed when the truck bed covers are in the vertical position.

A further object of the invention is to provide a truck bed cover system that is efficient, durable, affordable, and easy to use.

These together with additional objects, features and advantages of the folding truck bed cover system will be readily apparent to those of ordinary skill in the art upon reading the following detailed description of presently preferred, but nonetheless illustrative, embodiments of the folding truck bed cover system when taken in conjunction with the accompanying drawings.

In this respect, before explaining the current embodiments of the folding truck bed cover system in detail, it is to be understood that the folding truck bed cover system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the folding truck bed cover system. It is therefore important that the claims be regarded as including such equivalent construction insofar as they do not depart from the spirit and scope of the folding truck bed cover system. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
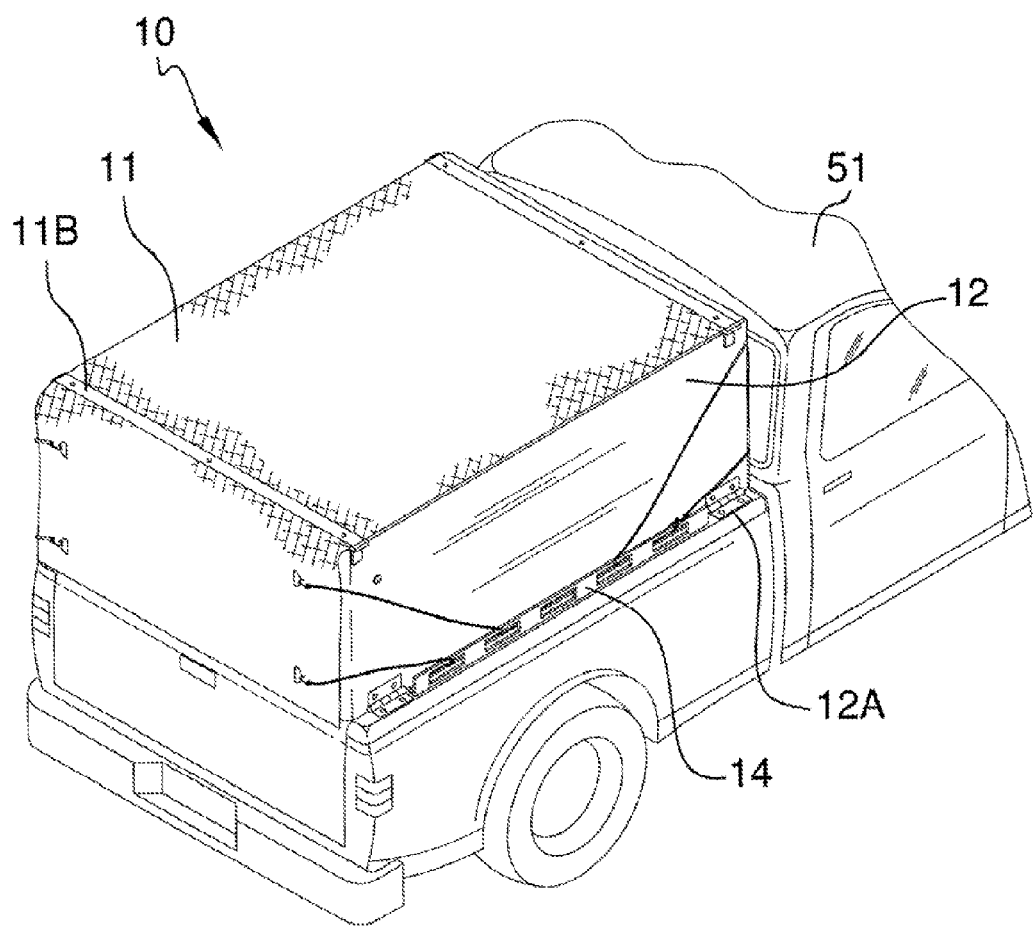
FIG. 1 illustrates an isometric view of the invention with the truck bed cover in a vertical position.
Figure 2:
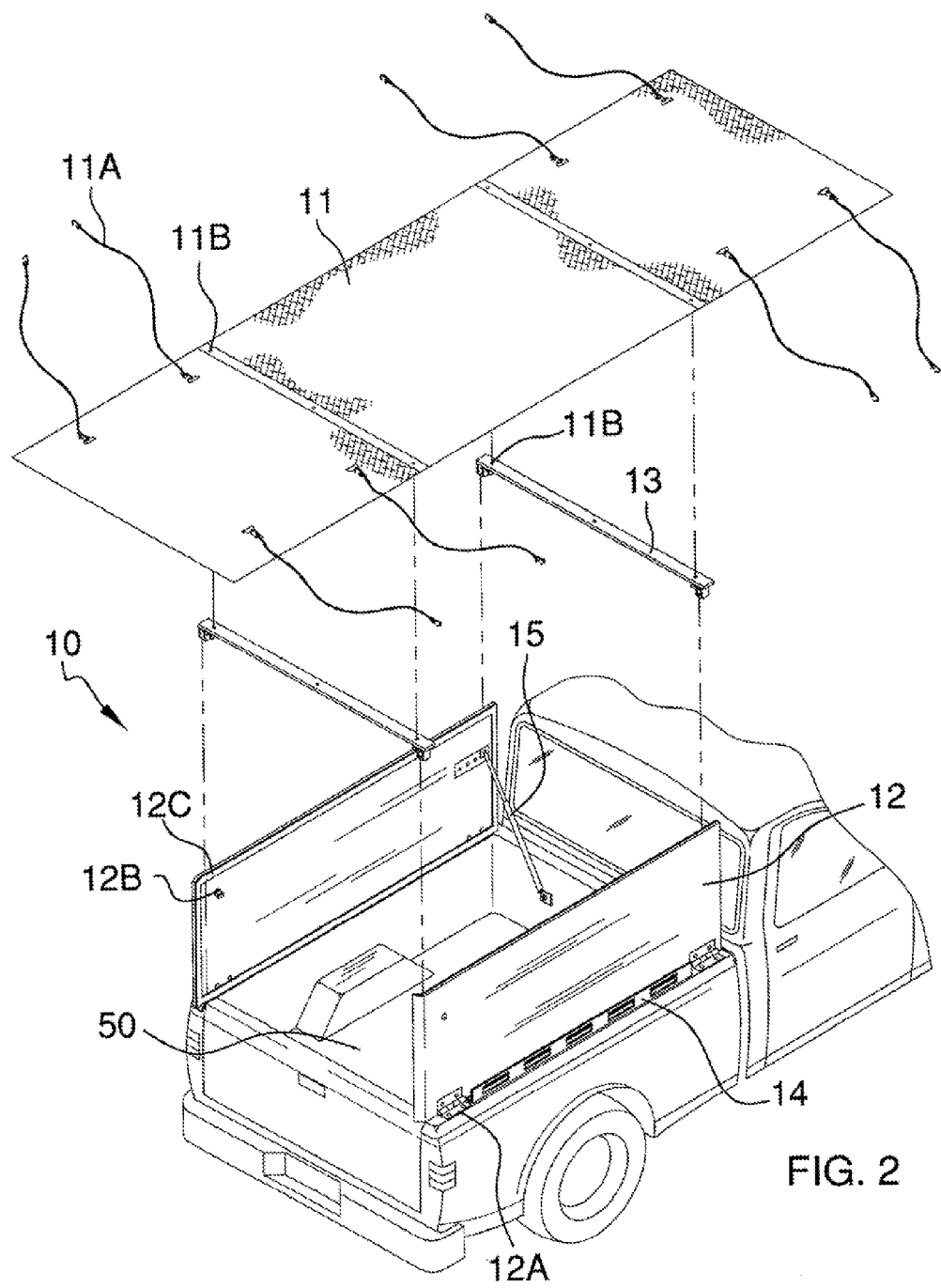
FIG. 2 illustrates an exploded view of the truck bed covers, supporting braces, and folding roof cloth.
Figure 3:
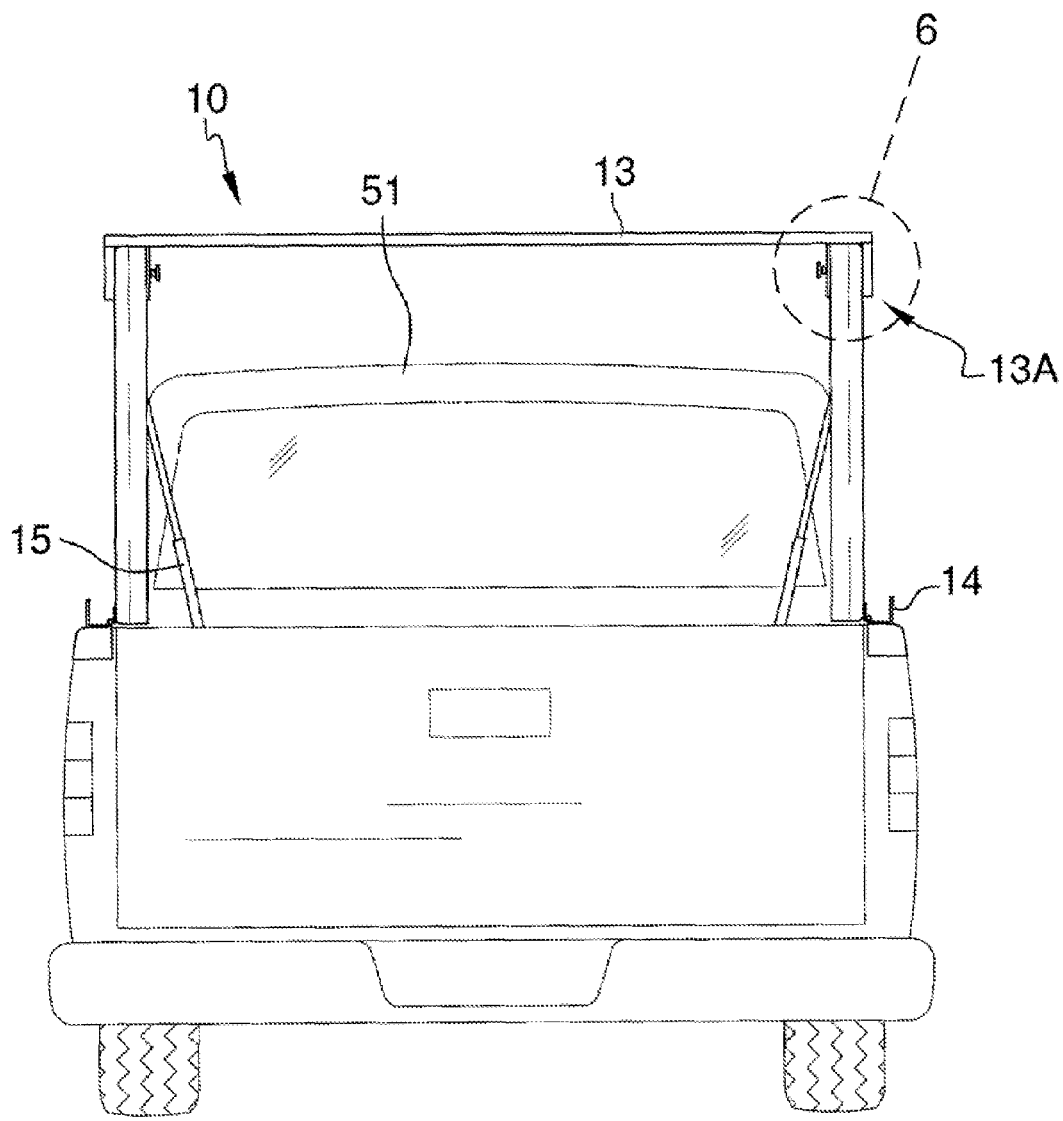
FIG. 3 illustrates a rear view of the invention.
Figure 4:
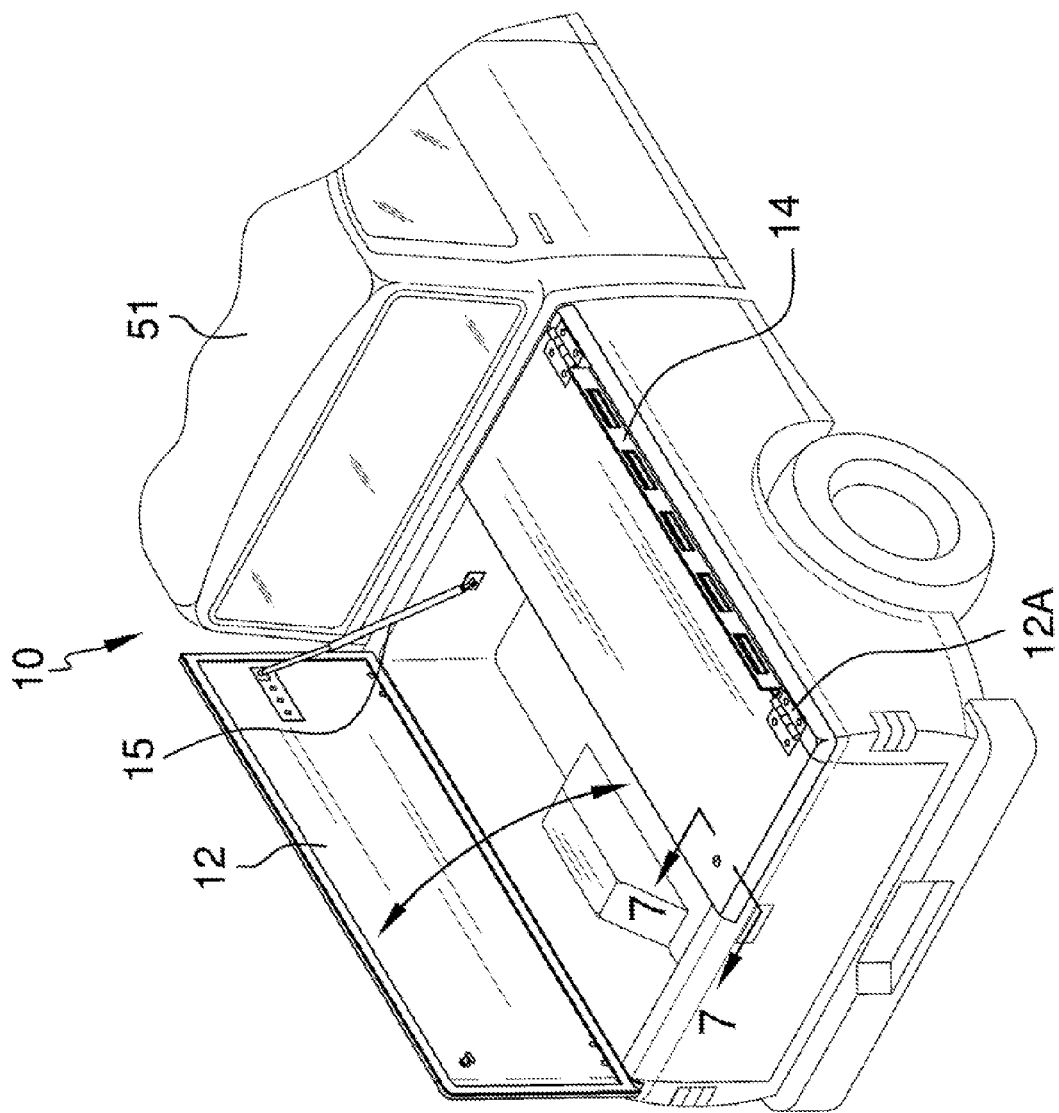
FIG. 4 illustrates an isometric view of the invention with the folding roof cloth and the supporting braces removed, and one truck bed cover down and the other truck bed cover in the vertical position.

Detailed reference will now be made to the present invention, examples of which are illustrated in FIGS. 1-7. A folding truck bed cover system 10 (hereinafter invention) includes a roof cover 11, a plurality of truck bed covers 12, a plurality of supporting braces 13, and a plurality of bed rails 14.

The truck bed covers 12 attach along either side of a truck bed 50 of a truck 51 via a hinge 12A. However, it shall be noted that a plurality of hinges 12A may be employed to support the truck bed covers 12.

Figure 5:
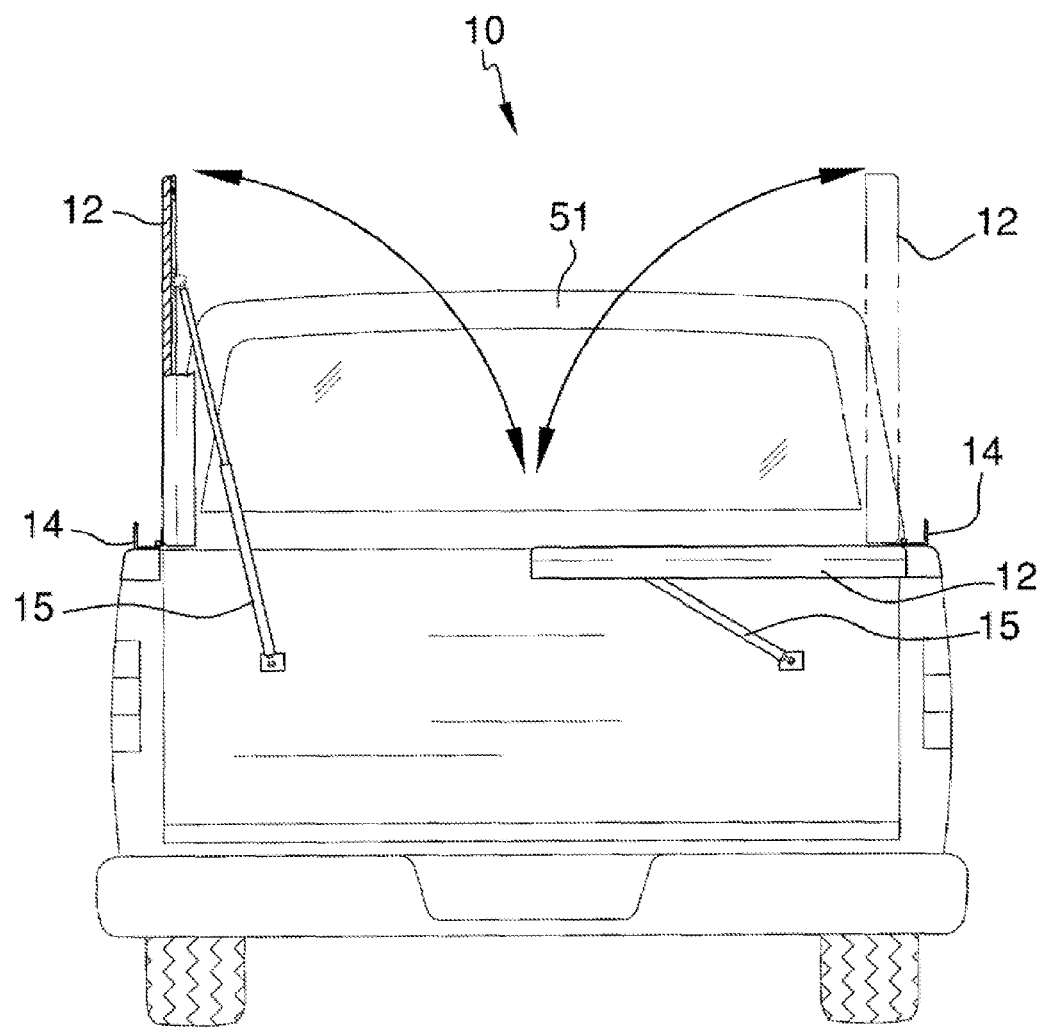
FIG. 5 illustrates a rear view of the invention as depicted in FIG. 4.
Figure 6:
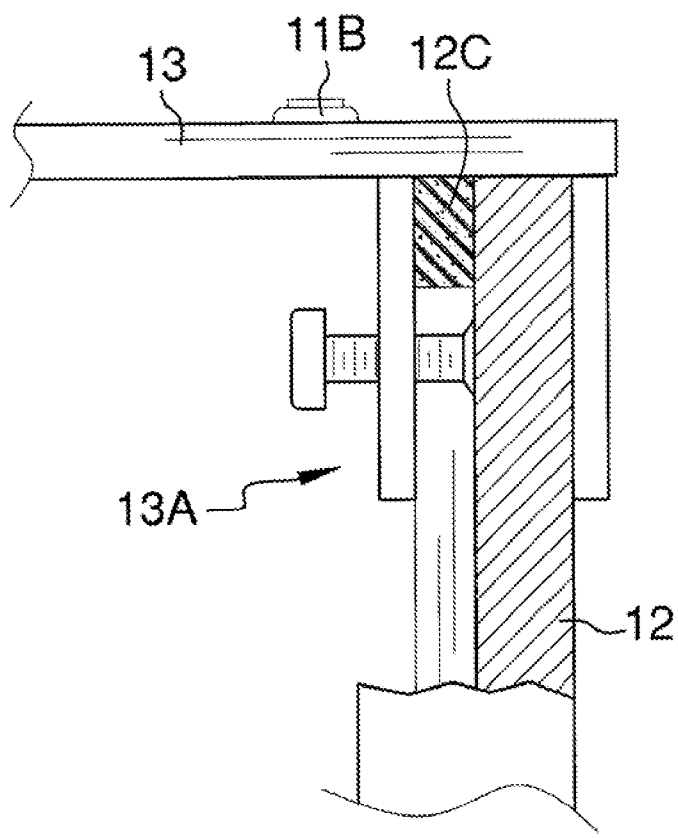
FIG. 6 illustrates a detailed view of the circle depicted in FIG. 3.

The truck bed covers 12 are restricted upon their rotational movement via a strut 15, which is mounted to a front wall 50A of the truck bed. The struts 15 enable the truck bed cover 12 to rotate from a horizontal position to a vertical position, as depicted in FIG. 5. However, it shall be noted that the strut 15 may provide a greater range of rotational movement that is either beyond or less than the range depicted in FIG. 5.

Figure 7:
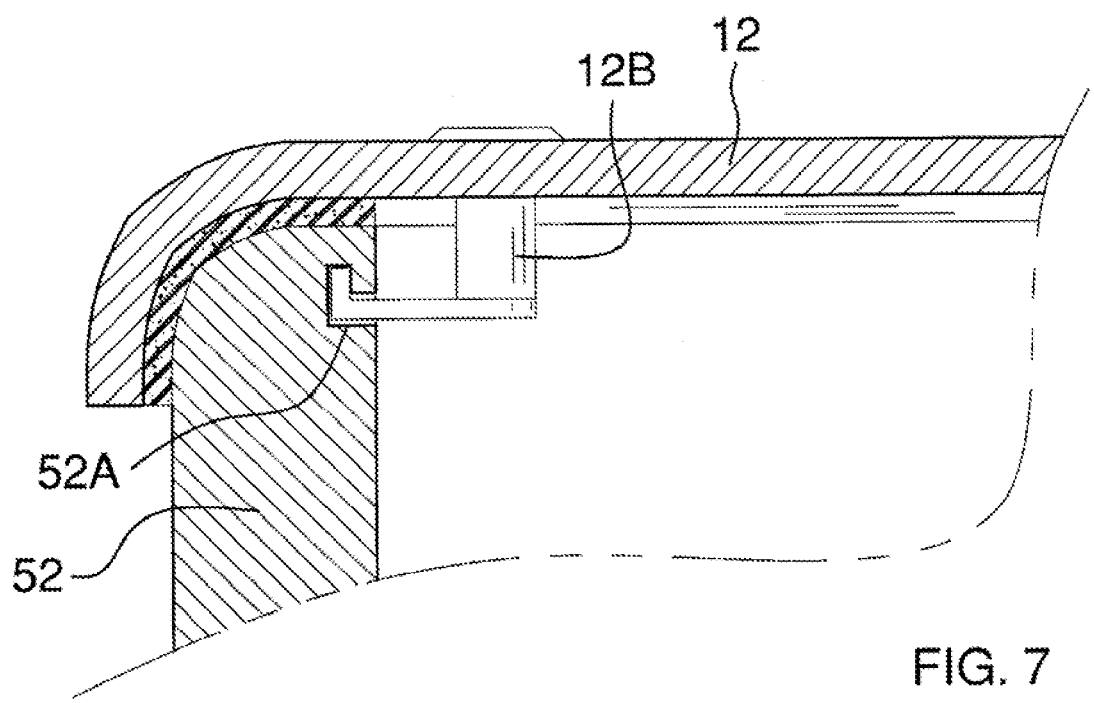
FIG. 7 illustrates a cross-sectional view of the invention along line 7-7 in FIG. 4.

Each truck bed cover 12 has a locking mechanism 12B that can lock the truck bed cover 12 in a horizontal position by engaging a notch 52A in a tailgate 52, see FIG. 7.

Each truck bed cover has a seal 12C that runs the perimeter of the truck bed cover 12, such that when the truck bed covers 12 are in the horizontal position, the seal 12C ensures a watertight seal between the invention 10 and the truck bed 50.

When the truck bed covers 12 are in the vertical position, the supporting braces 13 may be attached along the topmost edge of the truck bed cover 12 via clamp 13A. The clamp 13A is secured to the truck bed cover 12 just below the seal 12C. The supporting braces 13 have two purposes: (1) to stabilize the truck bed covers 12 in the vertical position, and (2) to support the roof cover 11. It shall be noted that the clamp 13A may be referred to as an affixing means and may be comprised of another securing means comprising a bolt and nut configuration.

The bed rails 14 are mounted along the top surface of the truck bed 53 and are aligned with the truck bed covers 12.

The roof cover 11 is draped over the supporting braces 13, and secured in place onto the invention 10 by a plurality of tie-straps 11A that tie onto the bed rails 14. The roof cover 11 also has a plurality of button snaps 11B, which snap onto the supporting braces 13. It shall be noted that the roof cover 11 may secure itself onto the invention 10 by either or both the use of the tie straps 11A and the button snaps 11B.

It shall be noted that other securing means may be employed as opposed to the button snaps 11B, and comprise hook and grommets, zippers, or nylon hook and loop strips. It shall be further noted that the roof cover 11 may cover only the top of the invention 10, the front opening above the truck bed 50, and/or the rear opening of the truck bed 50.

The truck bed cover 12 may be made of a material comprising wood, metal, plastic, carbon fiber, PLEXI-GLASS, or a FIBERGLASS. It shall be noted that the term "PLEXI-GLASS" is known as a synthetic polymer of methyl methacrylate (See Wikipedia). It shall also be noted that the term "FIBERGLASS" is a reinforcing agent for many polymer products; the resulting composite material, properly known as fiber-reinforced polymer or glass-reinforced plastic, is called fiberglass in popular usage (See Wikipedia). The roof cover 11 may be made of a flexible material comprising a cotton fabric, polyester, canvas fabric, or plastic sheeting.

With respect to the above description, it is to be realized that the optimum dimensional relationship for the various components of the invention 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. A folding truck bed cover system comprising:
(a) a plurality of truck bed covers;
wherein the truck bed covers are hingedly mounted along either side of the truck bed;
wherein each truck bed cover rotates from a closed position to a vertical position via a gas strut;
(b) a plurality of supporting braces;
wherein if the truck bed covers are raised to a vertical position, the supporting braces affix via an affixing means to the topmost edge of the truck bed covers in order to secure the truck bed covers in a vertical position;
(c) a roof cover;
wherein the roof cover is draped over the supporting braces to form a roof over the topmost opening between the truck bed covers;
wherein the roof cover is draped over the front opening between the truck bed covers;
wherein the roof cover is draped over the rear opening between the truck bed covers;

wherein the roof cover is secured to a set of bed rails that are mounted along the top edge of each side of the truck bed;

wherein each of the truck bed covers has a locking mechanism that locks the respective truck bed cover to a horizontal position by interaction with a groove in a tailgate of the truck bed.

2. The folding truck bed cover system as described in claim 1 wherein the affixing means comprises a clamp (that secures the truck bed cover just below a seal), or a bolt and nut configuration.

3. The folding truck bed cover system as described in claim 1 wherein the roof cover is made of a flexible material comprising a cotton fabric, polyester, a canvas fabric, or plastic sheeting.

4. The folding truck bed cover system as described in claim 1 wherein the roof cover is secured to the supporting braces by a securing means comprising button snaps, zippers, nylon hook and loop strips, or hook and grommets.

5. The folding truck bed cover system as described in claim 1 wherein the truck bed cover is made of a material comprising methyl methacrylate, metal, plastic, wood, fiber-reinforced polymer, or a glass-reinforced plastic.

* * * * *